United States Patent Office 3,461,269
Patented Aug. 12, 1969

3,461,269
MODIFIED WATER COOLED TORCH
Allan Ernest Stevens, Wokingham, William G. Hill, London, and David John Aldous, Surbiton, Surrey, England, assignors to Foster Wheeler Corporation, Livingston, N.J., a corporation of New York
Filed June 15, 1966, Ser. No. 557,653
Claims priority, application Great Britain, June 18, 1965, 25,901/65
Int. Cl. B23k 9/12
U.S. Cl. 219—125      6 Claims

ABSTRACT OF THE DISCLOSURE

An inert gas shielded non-consumable electrode arc welding torch for internal welding of a tube to a tube sheet having a support body and a stem rotatably extending from said body and projected within the bore of the tube, and an electrode supported at the end of the stem. The stem having an elongated bi-material outer sleeve of a tube of a non-brittle and non-warping material supported for rotation from said body and extending short of the region of said electrode and a substantially shorter length, coaxial, and coextending same cross-sectional sized ceramic sleeve in the region of said electrode. The support body directing through the stem coolant, current and inert gas supply. One end of the non-brittle tube and one end of the shorter ceramic sleeve tube, opposed to the said one end of the non-brittle tube, being reversely beveled. The beveled portion of the short ceramic sleeve tube end can then be axially centered and inserted within the beveled portion of the non-brittle tube end, so as to be axially aligned, centered and secured to the support tube by a bolt and nut arrangement extending from the end of the stem. The bolt and nut arrangement including a ceramic end cap also clamps the welding electrode and at the same time it secures and clamps the sleeve tube axially to the support tube.

---

This invention relates to welding apparatus and is especially concerned with an improved tube welding torch for use in internally welding tubes to tube plates or headers such as are commonly found in heat exchangers, particularly those used in nuclear installations.

Welding torches of the type described herein are for use in internally welding tubes, and particularly small bore tubes, to tube plates and headers. Such torches have a non-consumable electrode mounted on a stem which can be inserted into a tube to be welded and rotated so that the tip of the electrode moves over a circular path around the axis of the tube. Current for the electrode and inert gas for shielding the weld to prevent oxidation are supplied through the stem. Also conduits for the supply of coolant such as water to the vicinity of the electrode may be provided in the stem.

This type of torch has been used extensively and has made a very large number of excellent welds. It must, however, be handled with care so as to prevent damage to the thin ceramic sleeve surrounding the stem which projects into the hole in a tube plate or header and which carries the welding electrode at or near its end.

This ceramic sleeve must be very thin since the stem must contain a conducting part for electrically connecting the electrode to a supply source and a passage for the supply of an inert gas to the area of the weld, and may also have the conduits for supplying cooling water to keep the electrode reasonably cool. Also the overall size of the stem must be small so as to enable it to project into and weld small tubes having diameters of the order of about ⅗″. Such a thin ceramic sleeve is very brittle and is liable to warp or bow during manufacture and this has limited the length of this sleeve and hence the effective length of the torch. Thus it has only been possible to weld internally tubes to relatively thin tube plates or headers.

In a torch in accordance with the invention, however, the stem comprises an outer sleeve which is of metal or the like over part of its length and of a ceramic material at its end in the region of the electrode, and means for supplying welding current to the electrode and inert shielding gas to the weld region within the sleeve, the metal part of the sleeve being electrically insulated from the welding current by for example a thin insulating sleeve of plastics material.

Such a torch can have a much longer stem than previous torches without the difficulties encountered with long and thin ceramic sleeves. It is not essential, however, that it should be longer. Also, if the short ceramic sleeve is made so as to be replaceable from the electrode end of the torch, a damaged ceramic sleeve can be quickly replaced at the welding site without the necessity of returning the torch to a tool room for complete dismantling of the torch.

A welding torch in accordance with the invention will now be described, by way of example, with reference to the accompanying drawing, in which.

Figure 1:
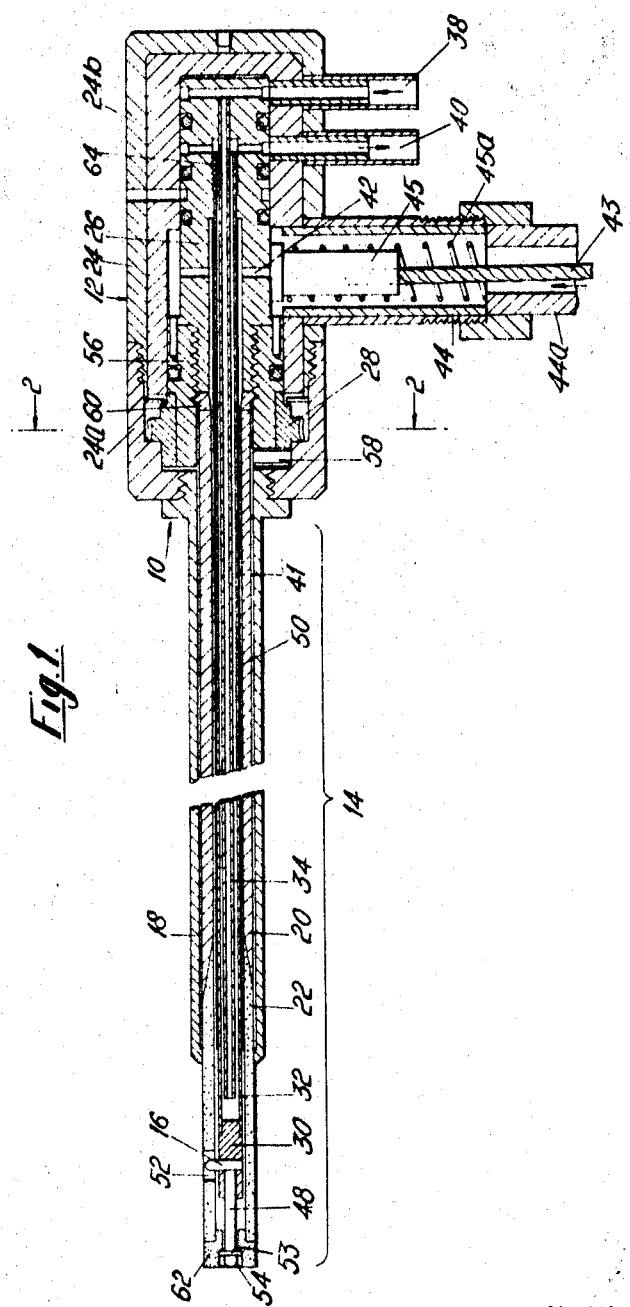
FIGURE 1 is a longitudinal section through the torch.
Figure 2:
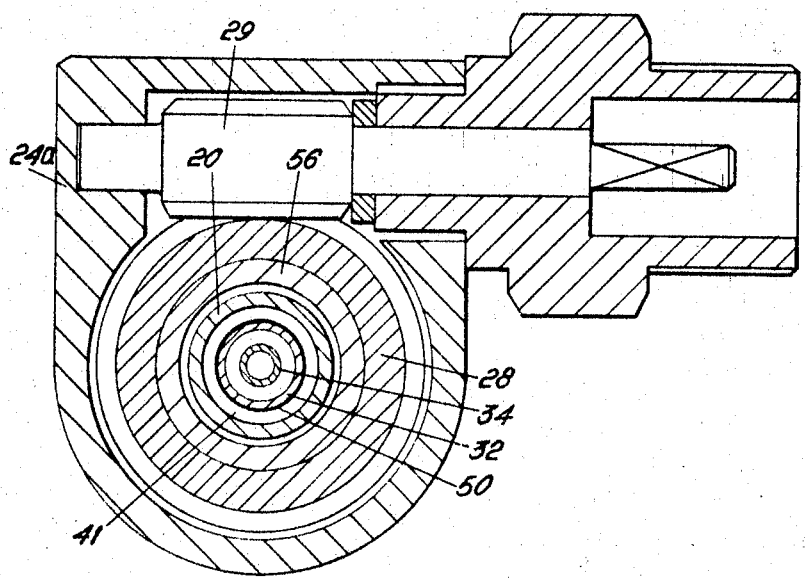
FIGURE 2 is an enlarged section taken on the line 2—2 of FIGURE 1.

The torch 10 shown in the drawing has a body 12 from which projects a stem 14 rotatable in the body and having near its end a welding electrode 16.

The stem 14 is composed of a number of concentric tubes and is shrouded by a mandril 18 which is arranged to fit closely within a hole in a header or tube plate so that the torch as a whole is held firmly during a welding operation and maintained coaxially within the hole and the electrode is held at a constant distance from the weld during the whole welding cycle. Mounted within the mandril 18 so as to be rotatable relatively to it is a metal tube 20, of for example stainless steel, which does not extend the full length of the stem 14. The end of the tube 20 has its inner surface tapered so that an end ceramic sleeve 22 which has a tapered pointed end can be received in the end of the tube 20 and form a continuation of it.

The body 12 comprises an outer cylinder 24 comprising a front part 24a and a rear part 24b which are screwed together. To the front part 24a the mandril 18 is rigidly attached by a screw threading. Rotatable within the cylinder 24 is a conducting current receiving core 26. A worm wheel 28 is fixed to the core 26 by a threaded insulated block 56 and the tube 20 is fixed to the block 56 by a pin 58. An insulating washer 60 is also provided so as completely to insulate the tube 20. A worm 29 engages the wheel 28 for rotating the tube 20 relatively to the cylinder 24 and the mandril 18 during a welding operation.

The electrode 16 is clamped in a block 30 of material of good conductivity such as copper by a stud bolt 48. The block 30 is fixed into the outer end of a tube 32 of for example copper which is positioned within the tube 20, and within the tube 32 is a further tube 34 of for example copper, the two tubes 32 and 34 together defining a conduit through which cooling water can be fed from an inlet 38 to the block 30 so as to cool this and then back to an outlet 40. The block is of restricted length so that the electrode can be kept reasonably cool.

An annular passage 41 is defined between the outer surface of the tube 32 and the inner surface of the tube 20 and sleeve 22 for the supply of argon or other inert gas to the region of the welding electrode 16 where the electrode projects through a hole 62 in the sleeve 22. The argon or other inert gas is applied to this annular passage-way through radial bores 42 in the core 26 from an inlet 44 to which is connected a supply line 44a. The end of the ceramic sleeve 22 is held by means of an end cap 52 to enable the inert gas to flow through the hole 62 in the sleeve 22 into which the electrode 16 projects. The electrode 16 and the end cap 52 are both locked in place by means of the stud bolt 48 and a washer 53 and a nut 54. The stud bolt is first used to clamp the electrode 16 in the block 30 and then to hold the end cap 52 by means of the nut 54.

Welding current is supplied to the electrode via a wire 43 in the inlet 44 and line 44a for the argon attached to a distributor 45 which is urged against the core 26 by a spring 45a. From there the current supply is through the copper tube 32 and the block 30. In order to insulate the copper tube 32 from the mandril 18 and tube 20 the outer surface of the tube 32 is surrounded by a thin sleeve 50 of insulating material such as poly-tetra-fluoroethylene over that part of its length where it could otherwise contact the tube 20. The sleeve 50 is sufficiently thin to allow the free passage of the inert gas through the passage 41.

The ceramic sleeve 22 is held in place by the end cap 52 and nut 54. Simply by removing the nut 54 and end cap 52 the welding electrode can be removed and thereafter the sleeve 22 can be removed and replaced if it is damaged. There is therefore no need to dismantle the rest of the torch in any way to replace this sleeve. This can represent a considerable saving of time instead of having to return the torch to a specialised tool room the replacement can be quickly effected on the spot.

The copper tube 32 must of course be firmly attached to the core 26 by for example screwing and soldering as at 64 so as to ensure that, when the screw 54 is tightened to hold the sleeve 22 in place, the tube 32 is not pulled away from the core.

Also it will be seen that only a relatively short length of ceramic sleeve is present in the torch. This short length can be manufactured, whereas a ceramic sleeve extending the whole length of the stem could only be manufactured with the greatest difficulty and even then may not be accurately shaped. Because a short ceramic sleeve is used no matter what is the length of the stem 14, relatively long stems can be used without problems with long ceramic sleeves and so a torch in accordance with the invention can be used with relatively thick tube plates or headers.

Although the tube 20 has been described as being of metal it can be of like materials which do not suffer from the difficulties encountered with ceramic sleeves.

We claim:

1. An electric arc welding torch for the internal welding of tubes to tube plates comprising
   a stem insertable into a tube to be welded,
   a non-consumable electrode mounted on said stem,
   means for rotating said electrode over a circular path around the tube axis of the tube,
   a support body from which said stem projects, said stem comprising an outer sleeve,
   conductor means within said sleeve for supplying welding current to said electrode,
   passage means within said sleeve for supplying inert shielding gas to the weld region, said outer sleeve further comprising a first part of metal-like material, second part of ceramic material surrounding said electrode, said first part and said second part having reversible tapered adjacent ends so that said adjacent ends can be axially aligned and fit one into the other, and
   insulating means between said first part and said conductor means.

2. A torch according to claim 1 further comprising an end cap removably fixed to said conductor means, said end cap contacting said second part to hold it in place, whereby after removal of said end cap said second part can be removed.

3. A torch according to claim 1 further comprising an insulating sleeve within said first of said outer sleeve to insulate said first part from said conductor means.

4. A torch according to claim 1, comprising an annular conduit defined between said conductor means and said outer sleeve, means for supplying inert shielding gas to said annular conduit, and means in communication with said annular conduit through which said gas flows from said outer sleeve around said electrode.

5. A torch according to claim 1 comprising a pair of tubes within said outer sleeve defining a passage for the flow of coolant to the vicinity of said electrode, means for supplying coolant to said passage and means for removal of coolant from said passage after passing in the vicinity of said electrode.

6. A torch according to claim 1 in which one of said pair of tubes is of electrically conductive material and is arranged to carry welding current to said electrode.

References Cited

UNITED STATES PATENTS

| | | | |
|---|---|---|---|
| 2,868,953 | 1/1959 | Gardner | 219—125 |
| 3,084,243 | 4/1963 | Gotch | 219—125 |
| 3,142,745 | 7/1964 | Gotch | 219—125 |
| 3,350,537 | 10/1967 | Lawrence et al. | 219—125 |

FOREIGN PATENTS 244,163    4/1963    Australia.

JOSEPH V. TRUHE, Primary Examiner

W. DEXTER BROOKS, Assistant Examiner

U.S. Cl. X.R.

219—60

UNITED STATES PATENT OFFICE
CERTIFICATE OF CORRECTION

Patent No. 3,461,269                                    August 12, 1969

Allan Ernest Stevens et al.

It is certified that error appears in the above identified patent and that said Letters Patent are hereby corrected as shown below:

Column 1, line 72, "3/5″" should read -- 3/8″ --.

Signed and sealed this 21st day of April 1970.

(SEAL)
Attest:

Edward M. Fletcher, Jr.                          WILLIAM E. SCHUYLER, JR.
Attesting Officer                                         Commissioner of Patents